United States Patent
Sievert

[11] Patent Number: 6,134,766
[45] Date of Patent: Oct. 24, 2000

[54] METHOD AND APPARATUS FOR INSTALLING CABLE-LIKE ELEMENTS INSIDE PIPES

[76] Inventor: Thomas M. Sievert, 9530 Carter Dr., Overland Park, Kans. 66212

[21] Appl. No.: 09/046,411

[22] Filed: Mar. 23, 1998

Related U.S. Application Data

[60] Provisional application No. 60/041,660, Mar. 24, 1997.

[51] Int. Cl.⁷ ..................................................... B23P 17/00
[52] U.S. Cl. ........................... 29/423; 441/133; 405/171; 405/154; 405/158; 138/128
[58] Field of Search ............... 29/423; 405/158, 405/154, 171; 138/128; 441/133

[56] References Cited

U.S. PATENT DOCUMENTS

| | | | |
|---|---|---|---|
| 3,594,835 | 7/1971 | Wilson | 9/8 R |
| 4,048,807 | 9/1977 | Ellers et al. | 61/105 |
| 4,185,809 | 1/1980 | Jonnes . | |
| 4,596,381 | 6/1986 | Hamrick . | |
| 4,691,896 | 9/1987 | Reeve et al. . | |
| 4,941,774 | 7/1990 | Harmstrof | 405/158 |
| 5,011,332 | 4/1991 | Kunze et al. | 405/158 |
| 5,022,634 | 6/1991 | Keeble . | |
| 5,118,226 | 6/1992 | Horii et al. . | |
| 5,143,353 | 9/1992 | Sano et al. . | |
| 5,163,657 | 11/1992 | Sano et al. . | |
| 5,234,198 | 8/1993 | Hale et al. . | |
| 5,293,678 | 3/1994 | Chamberlain et al. . | |
| 5,699,996 | 12/1997 | Boyle et al. . | |

*Primary Examiner*—P. W. Echols
*Assistant Examiner*—John C. Hong

[57] ABSTRACT

A method and apparatus for installing a cable-like element in a pipe by securing a buoyant element to the one cable-like element, the weight and buoyancy of the buoyant element and the cable-like element being matched with a fluid flowing agent so that the cable-like element is substantially buoyant in the fluid flowing agent; generating a flow of the fluid flowing agent in a pipe in a selected direction; and introducing the cable-like element with the buoyant element secured thereto into the flow of the flowing agent in the pipe so that the cable-like element is moved in the selected direction within the pipe.

13 Claims, 3 Drawing Sheets

METHOD AND APPARATUS FOR INSTALLING CABLE-LIKE ELEMENTS INSIDE PIPES

This appln claims the benefit of U.S. Provisional No. 60/041,660 filed Mar. 24, 1997.

FIELD OF THE INVENTION

The present invention relates generally to a method and apparatus for installing cable-like elements inside pipes.

BACKGROUND OF THE INVENTION

In the electrical power transmission and telecommunications industries, it is necessary to install power transmission cables and communications cables such as fiber optic cables over long distances. Such cables may be either suspended in the air between tower structures or buried underground. Tower structures, however, are expensive and unsightly and, furthermore, cables suspended from them are vulnerable to weather and flying objects such as low flying aircraft. Moreover, fiber optic cable is relatively non-resilient and can be easily broken from wind currents if suspended in the air. Therefore, fiber optic cable is not typically suspended in the air.

As an alternative to suspending cable in the air, power transmission cables and fiber optic cables are often buried underground. Buried cable typically requires that a trench be dug, the cable be laid in the trench, and soil be replaced in the trench. Such underground burying of cable can be time-consuming and, consequently, expensive, even more expensive than suspending the cable. To reduce the cost of burying cable underground, techniques have been developed to run cable through existing buried pipes, such as pipelines.

One technique that has been used to run cable in pipelines is to attach a pulling eye or pulling grip to one end of the cable. A pulling cable or rope is then threaded through the pipe or conduit and affixed to the pulling eye or pulling grip. A cable puller or winch is then used to pull the pulling cable or rope, followed by the transmission cable, through the pipeline or conduit. Prior to installation, to reduce friction and tension, the transmission cable is normally coated with a lubricant such as soap, bentomite clay or talc mixtures with water.

An alternative technique utilizes compressed air to propel the line or filament through the pipeline or conduit. A plug, which is configured to create an air-tight seal when inserted into the pipeline or conduit, is affixed to the end of the line or filament. The plug is inserted into the pipeline or conduit and compressed air is applied which propels the plug and the attached line or filament.

A major disadvantage with utilizing the pulling process or the compressed air process is that stress placed upon the line during installation limits the length of line that can be installed at any one time. This is true particularly for large diameter lines. As a result, the installation of relatively long lines in a pipeline or conduit requires the installation of several individual line segments which are spliced together. The installation of individual segments and the required splicing process is very expensive and time consuming.

It has been disclosed in U.S. Pat. No. 5,011,332 entitled "Apparatus and Method for Introducing a Cable-Like Element into a Pipe and Elements Suitable Therefore" issued Apr. 30, 1991 to Kunze et al. that a jacket may be positioned around the line to be installed in a pipeline. The jacket is provided with a profile to induce turbulence in a pipe to cause the line to oscillate in the pipe. The line is also matched with the fluid in the pipeline to be buoyant in the fluid so that contact of the jacket with the inner walls of the pipe is minimized.

There are several disadvantages associated with such a use of such a jacketed-line approach. For example, large diameter cable-like elements (e.g., two to six inches in diameter) can be very heavy, commonly from 10–20 pounds per linear foot. The installation of such heavy lines requires a large diameter jacket which would displace a significant percentage of the total cross-sectional fluid flow area of the pipeline. The jacket would reduce the total number of lines that could be installed, or reduce the volume of fluid thru-put, if the pipeline was to be utilized simultaneously for fluid transmission. Moreover, the jacket cannot be removed; therefore, such a line continues indefinitely to occupy a large portion of the pipeline cross-section and to oscillate in the pipeline resulting in increased turbulence and friction loss, and hence pressure loss, in the flow of fluid in the pipeline.

Accordingly, a continuing search has been directed to the development of improved methods which can be used to install cable, particularly heavy large-diameter cables, through pipes without requiring the cable to be installed in small segments that must be spliced together, and while minimizing the pressure loss of fluid flowing through the pipeline.

SUMMARY OF THE INVENTION

According to the present invention, an improved method for installing a cable-like element in a pipe comprises securing a buoyant element to the cable-like element, the weight and buoyancy of the buoyant element and the cable-like element being matched with a fluid flowing agent so that the cable-like element is substantially buoyant in the fluid flowing agent; generating a flow of the fluid flowing agent in a pipe in a selected direction; and introducing the cable-like element with the buoyant element secured thereto into the flow of the flowing agent in the pipe so that the cable-like element is moved in the selected direction within the pipe.

The present invention also provides an apparatus adapted for installing a cable-like element in a pipe with a fluid flowing agent moving in a selected direction in the pipe, comprising a buoyant element; and means for securing the buoyant element to the cable-like element, the weight and buoyancy of the cable-like element secured to the buoyant element so that the cable-like element is substantially buoyant in the fluid flowing agent.

DESCRIPTION OF THE PREFERRED EMBODIMENT(S)

Figure 1:
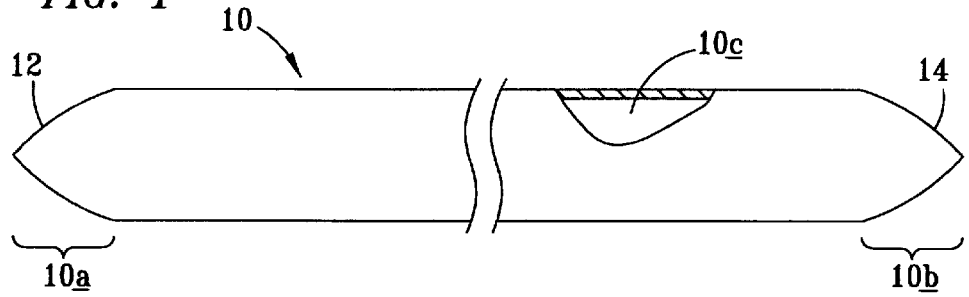
FIG. 1 is a schematic elevation view of buoyant element used to float a cable-like element inside a pipe in accordance with the present invention.

Referring to FIG. 1 of the drawings, the reference numeral 10 generally designates a buoyant element 10 embodying features of the present invention. The buoyant element 10 is configured as an elongated hollow tubular member having two ends 10*a* and 10*b* with caps 12 and 14, respectively, positioned thereon for hermetically sealing the buoyant element. The buoyant element 10 and the caps 12 and 14 are fabricated from a lightweight material such as aluminum, polyethylene, or the like. An interior portion 10*c* of the buoyant element 10 may form a vacuum or may, optionally, contain a gas, such as air, nitrogen, or the like, or a lightweight solid material such as a foam, or a combination of a gas and a lightweight material thereof. The buoyant element 10 is configured and sized in a manner well known to those skilled in the art to enable a cable-like element, described below, secured to the buoyant element 10 to be substantially buoyant in a fluid agent flowing through the interior of a pipe, such as a petroleum transmission pipeline, a conduit, or the like, also described below.

Figure 2:
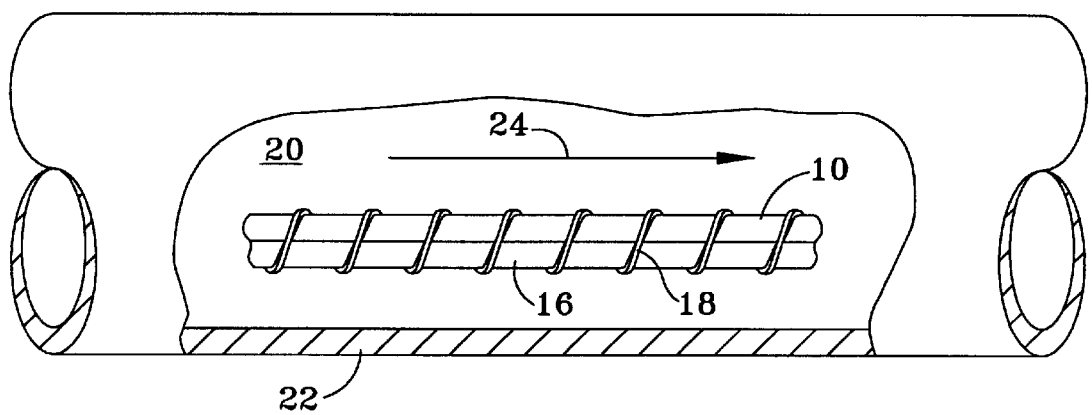
FIG. 2 is a schematic elevation view of a cable-like element connected to a buoyant element in a flowing agent inside a pipe.

FIG. 2 shows a cable-like element 16, such as an electrical transmission cable, a fiber optic cable, or the like, to which one or more buoyant elements 10 are attached using a connector or a strap 18. The buoyant element 10 and the attached cable-like element 16 are floating in a flowing agent 20 inside a pipe 22. The flowing agent 20 is flowing in a direction indicated schematically by an arrow 24, thereby moving the buoyant element 10 with attached cable-like element 16 through the pipe 22. While not shown, it is understood that a plurality of cable-like elements 16 can be installed at the same time using one or more buoyant elements 10.

Figure 3:
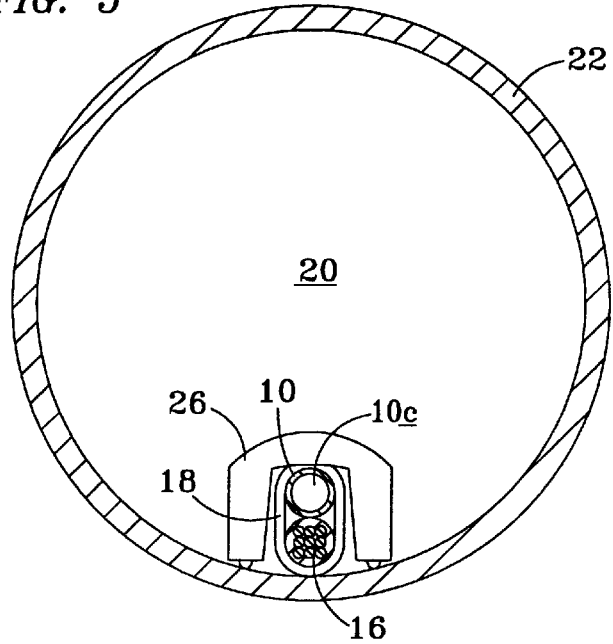
FIG. 3 is a cross sectional view of an apparatus straddling a buoyancy element which is connected to a cable-like element.
Figure 4:
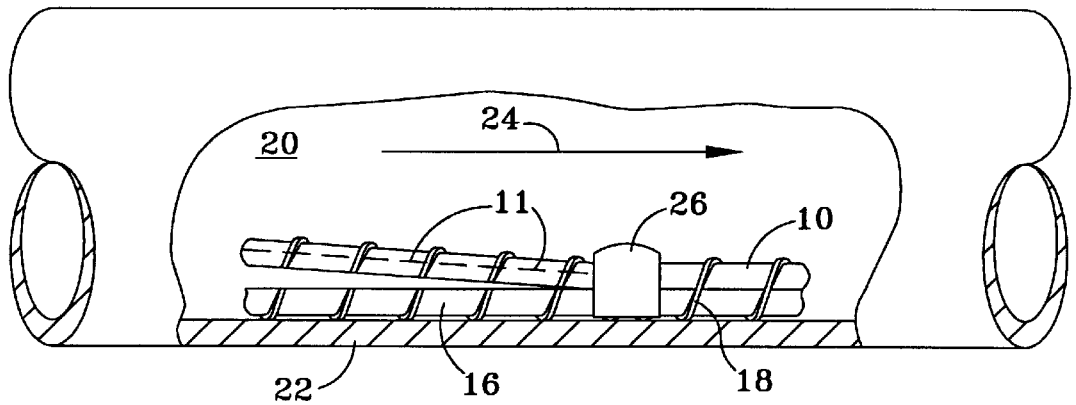
FIG. 4 is a schematic elevation view of an apparatus moving along a buoyant element which is connected to a cable-like element. The apparatus is rupturing the buoyant element and severing the connection between the buoyant element and the cable-like element.

FIGS. 3 and 4 schematically demonstrate a method that results in the separation of the buoyant element 10 from the cable-like element 16 after the cable-like element 16 has been positioned in the pipe 22. When it is determined that the cable-like element 16 is properly located in the pipe 22, the movement of the flowing agent 20 inside the pipe 22 is discontinued which results in the cable-like element 16 assuming a stationary position in the pipe 22. An apparatus 26 will be inserted into the pipe 22 which will be designed to simultaneously straddle the buoyant element 10 and the cable-like element 16. The apparatus 26 will be capable of forward movement indicated schematically by the arrow 24. As the apparatus 26 moves forward through the pipe 22, it will sever the connectors or straps 18 that attach the buoyant element 10 to the cable-like element 16. In order to relieve the increased buoyant of the buoyancy element 10 due to the separation from the cable-like element 16, the apparatus 26 will pierce or otherwise rupture the buoyant element 10 at periodic intervals 11. The apparatus 26, configured and sized by those well known in the art, may be adapted to perform the severing of the connectors or straps 18 and the piercing or rupturing 11 of the buoyant element 10 in a number of different ways. The piercing or rupturing 11 of the buoyant element 10 will cause displacement of the gas or vacuum inside the interior portion 10*c*, or saturation of the lightweight solid material inside the interior portion 10*c*, with the flowing agent 20 and will thereby result in a reduction in the buoyancy of the buoyant element 10. The buoyant element 10 will be adapted so that after it has been pierced or otherwise ruptured 11, it will become neutrally buoyant and suspended in the flowing agent 20 in the pipe 22.

Figure 5:
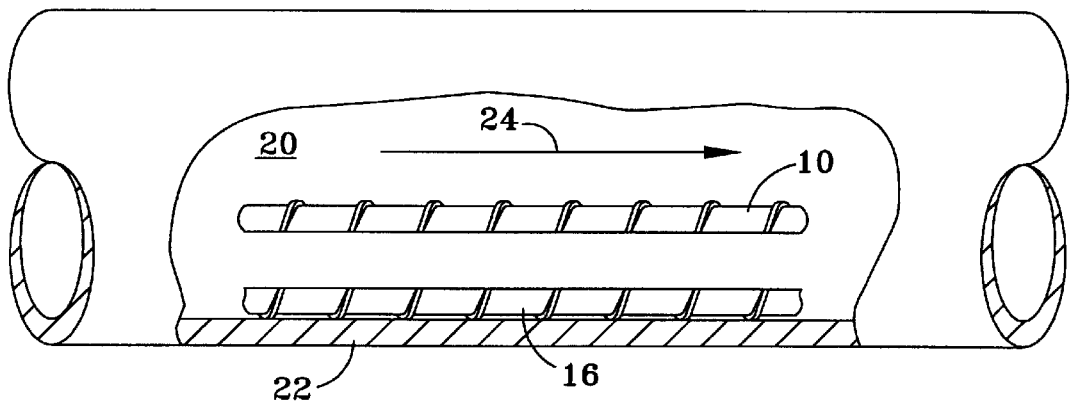
FIG. 5 is a schematic elevation view of the removal of a buoyant element from the pipe after is has been severed from the cable-like element.

FIG. 5 depicts the removal of the buoyant element 10 from the pipe 22 after the buoyant element 10 has been completely severed from the cable-like element 16. After the separation of the buoyant element 10 from the cable-like element 16, the movement of flowing agent 20 inside the pipe 22 will be resumed in a specific direction indicated schematically by the arrow 24. The movement of the flowing agent 20 will cause the buoyant element 10 to move through the pipe 22 in the specific direction indicated schematically by the arrow direction 24 while the cable-like element 16 will remain stationary on the bottom of the pipe 22. The buoyant element 10 will be transported by the flowing agent 20 to a point where it can be removed from the pipe 22. The buoyant element 10 will then be recovered and discarded or recycled for future use.

Figure 6:
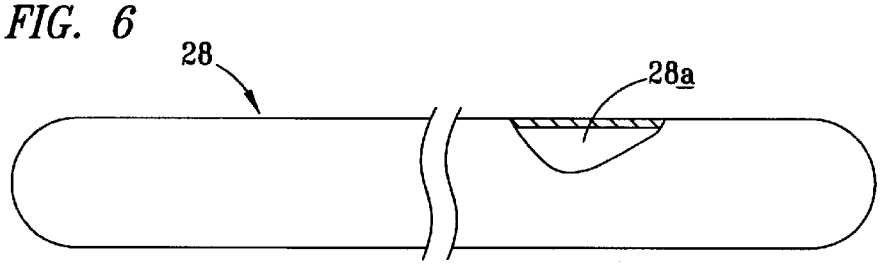
FIG. 6 is a schematic elevation view of an elongated inflatable bladder.

In the embodiment schematically shown in FIG. 6, an elongated inflatable bladder 28 is shown. An interior portion of the elongated inflated bladder 28*a* will contain a gas such as air, nitrogen, or the like. The elongated inflatable bladder 28 is configured and sized in a manner well known to those skilled in the art to enable a cable-like element secured to the elongated inflatable bladder 28 to be substantially buoyant in a flowing agent flowing through the interior of a pipe, such as a petroleum transmission pipeline, a conduit, or the like.

Figure 7:
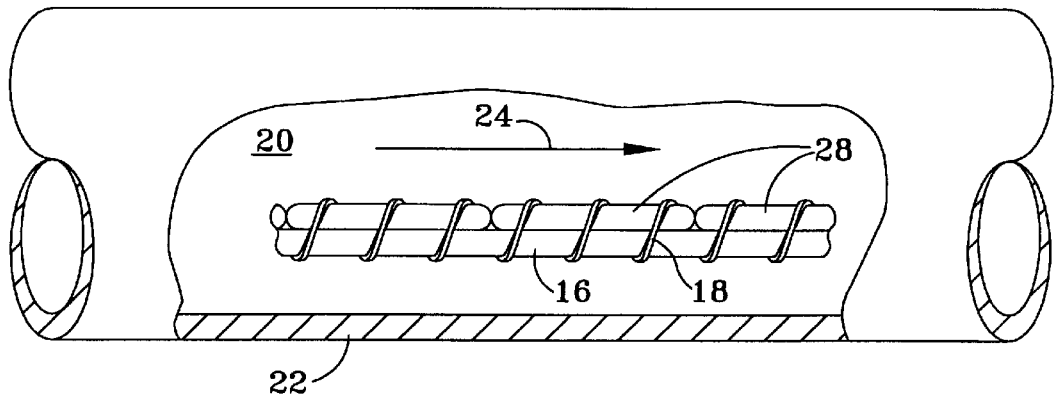
FIG. 7 is a schematic elevation view of a cable-like element connected to an elongated inflatable bladder suspended in a flowing agent inside a pipe.

FIG. 7 shows a cable-like element such as an electrical transmission cable, a fiber optic cable, and the like 16 to which one or more elongated inflatable bladders 28 are attached using a connector or a strap 18. While it is not shown, it is understood that a plurality of cable-like elements can be installed at the same time using one or more elongated inflatable bladders. The elongated inflatable bladder 28 and the attached cable-like element 16 are floating in a flowing agent 20 inside a pipe 22. The flowing agent 20 is flowing in a specific direction indicated schematically by the arrow 24 thereby moving the elongated inflatable bladder 28 with attached cable-like element 16 through the pipe 22. A series of consecutive elongated inflatable bladders may be utilized depending upon the length of the cable-like element installed.

Figure 8:
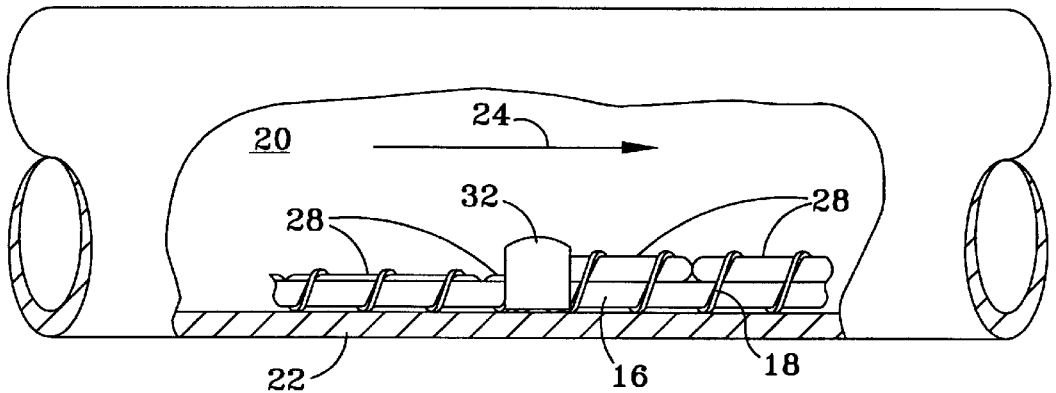
FIG. 8 is a schematic elevation view of an apparatus moving along an elongated inflatable bladder which is connected to a cable-like element. The apparatus is rupturing the bladder.

FIG. 8 schematically demonstrates a process that results in the placement of a cable-like element 16 inside a pipe 22 using an elongated inflatable bladder 28. When it is determined that the cable-like element 16 is properly located in the pipe 22, the movement of the flowing agent 20 inside the pipe 22 is discontinued which results in the cable-like element 16 assuming a stationary position the pipe 22. An apparatus 32 will be inserted into the pipe 22 which will be designed to simultaneously straddle the elongated inflatable bladder 28 and the cable-like element 16. The apparatus 32 is capable of forward movement in the direction indicated schematically by the arrow 24. As the apparatus 32 moves forward through the pipe 22, it will pierce or otherwise rupture the elongated inflatable bladder 28. The apparatus 32, configured and sized by those well known in the art, may be adapted to perform the piercing or rupturing of the elongated inflatable bladder 28 in a number of different ways. The piercing or rupturing of the elongated inflatable bladder 28 will cause the bladder to collapse and the cable-like element 16 to settle on the floor of the pipe 22. The collapse of the elongated inflatable bladder 28 will thereby increase the remaining usable cross-section of the pipe 22 and render removal of the bladder 28 unnecessary. Optionally, however, the bladder 28 may be removed from the pipe 22 in a manner similar to how the buoyant element 10 was removed from the pipe 22, as discussed above with respect to FIG. 5.

Figure 9:
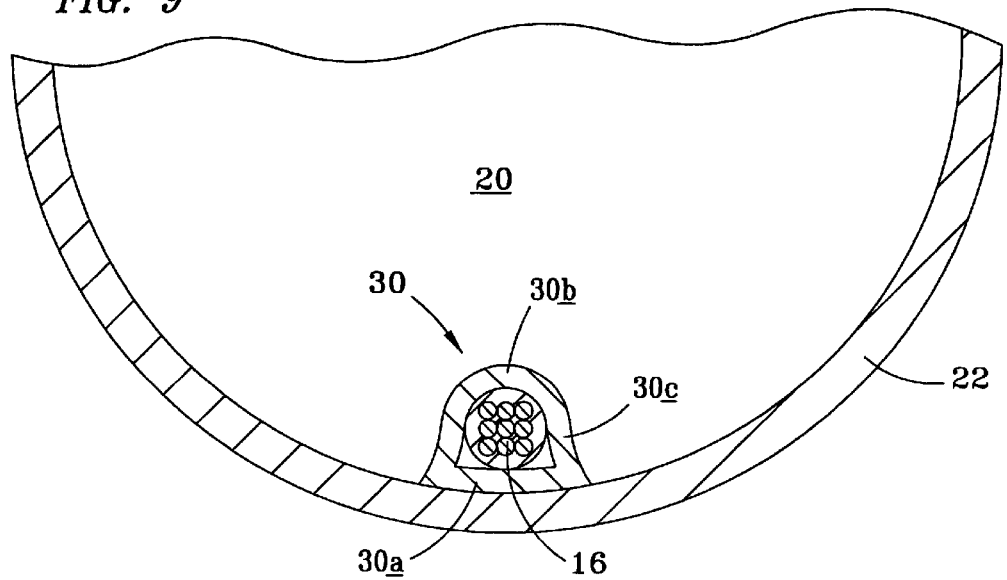
FIG. 9 is a schematic cross section view of a jacket or casing which surrounds or contains a cable-like element during installation and while it is in place on the floor of the pipe.

FIG. 9 schematically shows a jacket or casing 30*a*, 30*b*, 30*c* that will surround or contain a cable-like element 16 during installation and while it is in place on the floor of the pipe 22. The casing, which is used optionally, will be useful where the cable-like element will be installed inside a pipe which will be used for the transport of a flowing agent. The casing will be configured to achieve one or more of the following objectives: (a) to protect the cable-like element from the pressure and caustic effects of the flowing agent in the pipeline; (b) to provide a surface which is exposed to the flowing agent in the pipeline which will minimize the buildup of sediments or waxes during fluid circulation; (c) to configure the exposed outer profile of the cable-like element so that the turbulence and fluid flow disruption resulting from insertion of the cable-like element will be minimized; and, (d) to minimize the friction that results when the outer sides or bottom surface of the casing contacts the inside wall of the pipe during installation of the cable-like element.

The bottom of the outside casing structure 30*a* is curved to conform to the bottom surface of the pipe 22. Wheels, rollers, roller type devices, or a combination thereof may also be attached to, or embedded in, the bottom or sides of the casing which will serve to reduce friction when coming in contact with the inside wall of the pipe which may occur as the cable-like element 16 drifts laterally in a random manner in the flowing agent 20 during installation. These wheels, rollers, or roller type devices will also be used to reduce friction when the cable-like element is removed from the pipe. The top 30*b* and side 30*c* outer surface of the casing will be rounded with edges that slope or are contoured downward to the bottom inside surface of the pipe 22. This will prevent buildup of sediments or waxes under and along the sides of the cable-like element and will reduce the turbulence created by introduction of the cable-like element 16 into the pipe 22.

The casing will be manufactured from a material that is resistant to the pressure and corrosive effects of the fluid flowing inside the pipeline. Plastic-like materials such as polypropylene and the like can be use for manufacture of the casing.

Although illustrative embodiments of the invention have been shown and described, a wide range of modifications, changes, and substitutions are contemplated in the foregoing disclosure and in some instances, some features of the present invention may be employed without a corresponding use of the other features. Accordingly, it is appropriate that the appended claims be construed broadly and in a manner consistent with the scope of the invention.

Having thus described the invention, what is claimed is:

1. A method for installing at least one cable-like element in a pipe, comprising the steps of:

securing at least one buoyant element to the at least one cable-like element, the weight and buoyancy of the at least one buoyant element secured to the at least one cable-like element being matched with a fluid flowing agent so that the at least one cable-like element is substantially buoyant in the fluid flowing agent;

generating a flow of the fluid flowing agent in a pipe in a selected direction;

introducing the at least one cable-like element with the at least one buoyant element secured thereto into the flow of the flowing agent in the pipe so that the at least one cable-like element is moved in the selected direction within the pipe;

puncturing the buoyant element;

removing the buoyant element from the at least one cable-like element and from the pipe; and allowing the at least one cable-like element to rest on the bottom of the pipe.

2. The method of claim 1 wherein the step of securing the at least one buoyant element to the at least one cable-like element comprises removably securing the at least one buoyant element to the at least one cable-like element.

3. The method of claim 1 wherein the at least one buoyant element comprises at least one hermetically sealed tubular element.

4. The method of claim 1 wherein the at least one buoyant element comprises at least one hermetically sealed tubular element having a vacuum substantially formed therein.

5. The method of claim 1 wherein the at least one buoyant element comprises at least one hermetically sealed tubular element containing a gas, or a lightweight material such as a foam, or a combination of a gas and a lightweight material therein.

6. The method of claim 1 wherein the at least one buoyant element comprises at least one elongated inflatable bladder, and the method further comprises inflating the inflatable bladder.

7. The method of claim 1 wherein the step of securing further comprises positioning the at least one buoyant element adjacent to the at least one cable-like element, and wrapping tape around the at least one buoyant element and the at least one cable-like element.

8. The method of claim 1 wherein the step of securing further comprises positioning the at least one buoyant element adjacent to the at least one cable-like element, and securing at least one strap around the at least one buoyant element and the at least one cable-like element.

9. The method of claim 1 wherein the at least one cable-like element is non-buoyant without the at least one buoyant element secured thereto.

10. The method of claim 1 wherein the at least one buoyant element and the at least one cable-like element are external of each other.

11. The method of claim 1 further comprising the step of causing the at least one cable-like element to rest on the bottom of the pipe.

12. A method for installing at least one cable-like element in a pipe, comprising the steps of:

securing at least one buoyant element to the at least one cable-like element, the weight and buoyancy of the at least one buoyant element secured to the at least one cable-like element being matched with a fluid flowing agent so that the combination of the at least one buoyant element and the at least one cable-like element is substantially buoyant in the fluid flowing agent;

generating a flow of the fluid flowing agent in a pipe in a selected direction;

introducing the at least one cable-like element with the at least one buoyant element secured thereto into the flow of the flowing agent in the pipe so that the at least one cable-like element is moved in the selected direction within the pipe;

collapsing the buoyant element; and allowing the at least one cable-like element to rest on the bottom of the pipe.

13. A method for installing at least one cable-like element in a pipe, comprising the steps of:

securing at least one buoyant element to the at least one cable-like element, the weight and buoyancy of the at least one buoyant element secured to the at least one cable-like element being matched with a fluid flowing agent so that the combination of the at least one buoyant element and the at least one cable-like element is substantially buoyant in the fluid flowing agent;

generating a flow of the fluid flowing agent in a pipe in a selected direction;

introducing the at least one cable-like element with the at least one buoyant element secured thereto into the flow of the flowing agent in the pipe so that the at least one cable-like element is moved in the selected direction within the pipe;

collapsing the buoyant element;

removing the buoyant element from the at least one cable-like element and from the pipe; and allowing the at least one cable-like element to rest on the bottom of the pipe.

\* \* \* \* \*

UNITED STATES PATENT AND TRADEMARK OFFICE
CERTIFICATE OF CORRECTION

PATENT NO. : 6,134,766
DATED : October 24, 2000
INVENTOR(S) : Thomas M. Sievert

It is certified that error appears in the above-identified patent and that said Letters Patent is hereby corrected as shown below:

<u>Column 3,</u>
Line 64, delete "buoyant of the buoyancy" and insert -- buoyancy of the buoyant --

Signed and Sealed this

Thirteenth Day of November, 2001

Attest:

NICHOLAS P. GODICI
Attesting Officer     Acting Director of the United States Patent and Trademark Office